(No Model.) 11 Sheets—Sheet 1.

E. B. ELY & S. SALMON.
MECHANISM FOR LOADING COAL.

No. 419,145. Patented Jan. 7, 1890.

Witnesses:
Jas. E. Hutchinson.
Henry C. Hazard.

Inventors:
E. B. Ely and S. Salmon, by
Pindle and Russell, their Attys.

(No Model.) 11 Sheets—Sheet 2.
E. B. ELY & S. SALMON.
MECHANISM FOR LOADING COAL.

No. 419,145. Patented Jan. 7, 1890.

(No Model.) 11 Sheets—Sheet 3.

E. B. ELY & S. SALMON.
MECHANISM FOR LOADING COAL.

No. 419,145. Patented Jan. 7, 1890.

Witnesses:
Jas. E. Hutchinson
Henry C. Hazard

Inventors:
E. B. Ely and S. Salmon, by
Prindle and Russell, their Attys.

N. PETERS, Photo-Lithographer, Washington, D. C.

(No Model.) 11 Sheets—Sheet 9.

E. B. ELY & S. SALMON.
MECHANISM FOR LOADING COAL.

No. 419,145. Patented Jan. 7, 1890.

Witnesses:
Jas. E. Hutchinson
Henry C. Hazard

Inventor.
E. B. Ely & S. Salmon by
Crindle & Russell, their Attys (No Model.) 11 Sheets—Sheet 10.
E. B. ELY & S. SALMON.
MECHANISM FOR LOADING COAL.
No. 419,145. Patented Jan. 7, 1890.
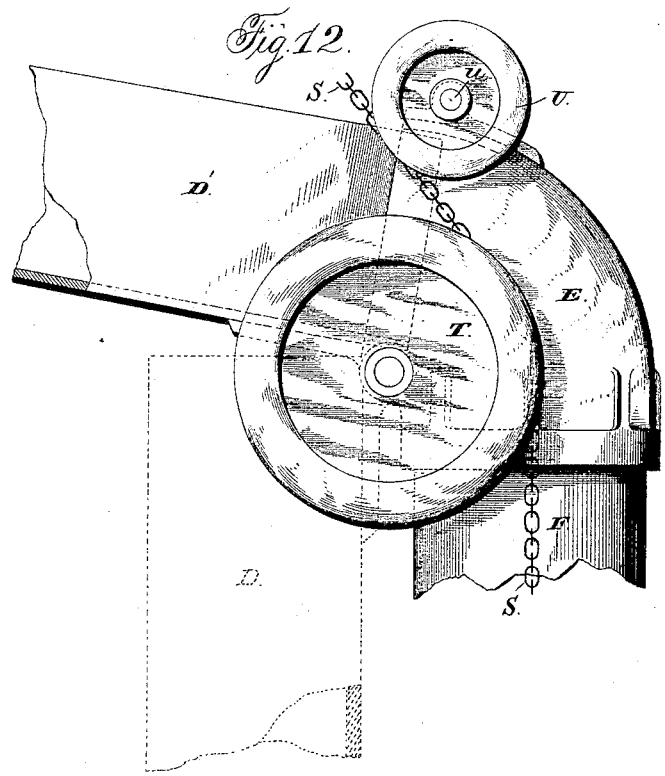
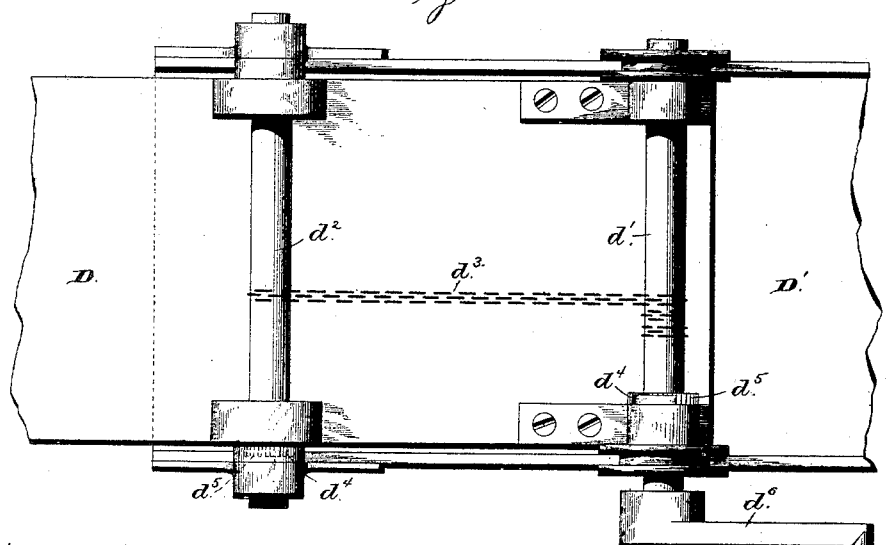

(No Model.) 11 Sheets—Sheet 11.
E. B. ELY & S. SALMON.
MECHANISM FOR LOADING COAL.

No. 419,145. Patented Jan. 7, 1890.

UNITED STATES PATENT OFFICE.

EZRA B. ELY, OF BERGEN POINT, NEW JERSEY, AND SAMUEL SALMON, OF DRIFTON, PENNSYLVANIA.

MECHANISM FOR LOADING COAL.

SPECIFICATION forming part of Letters Patent No. 419,145, dated January 7, 1890.

Application filed May 28, 1888. Serial No. 275,337. (No model.)

*To all whom it may concern:*

Be it known that we, EZRA B. ELY, of Bergen Point, in the county of Hudson, and in the State of New Jersey, and SAMUEL SALMON, of Drifton, in the county of Luzerne, and in the State of Pennsylvania, have invented certain new and useful Improvements in Mechanism for Loading Coal upon Vessels; and we do hereby declare that the following is a full, clear, and exact description thereof, reference being had to the accompanying drawings, in which—

Figure 1:
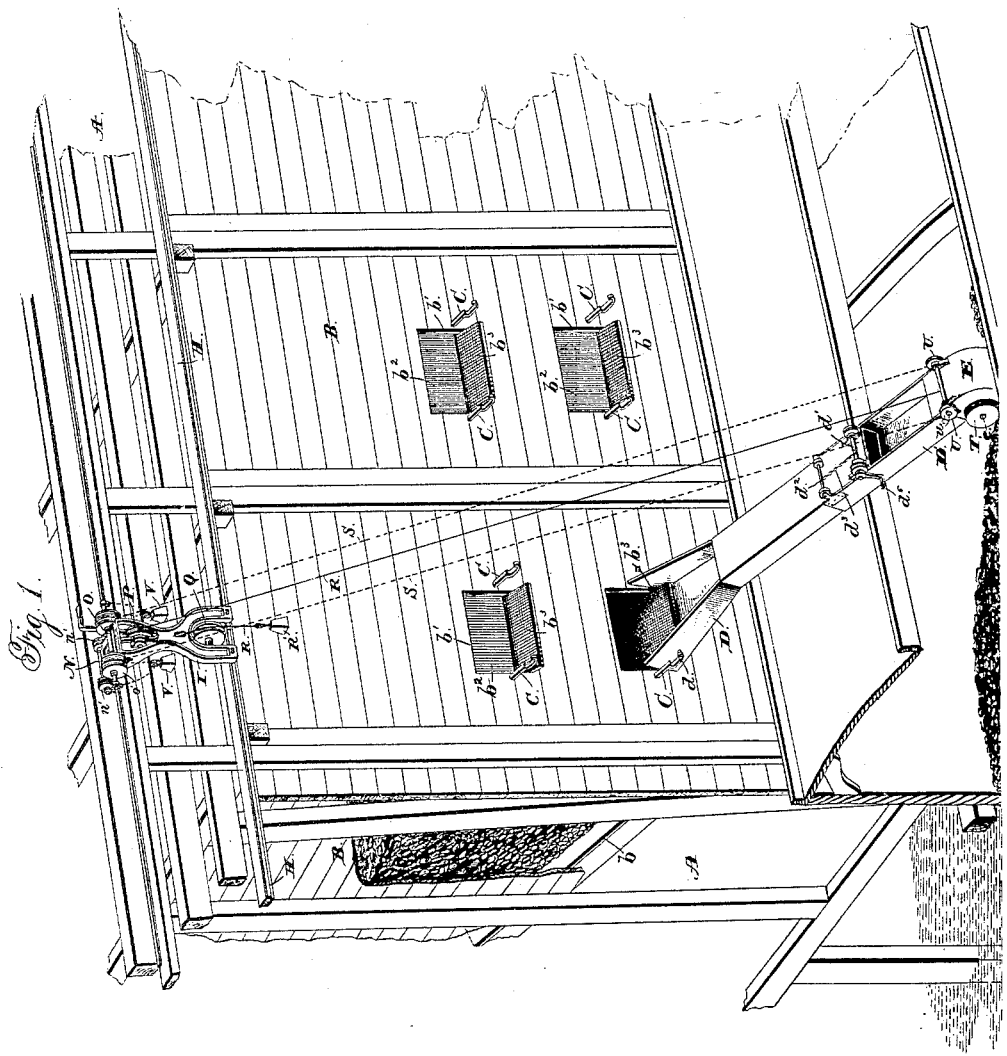
Figure 2:
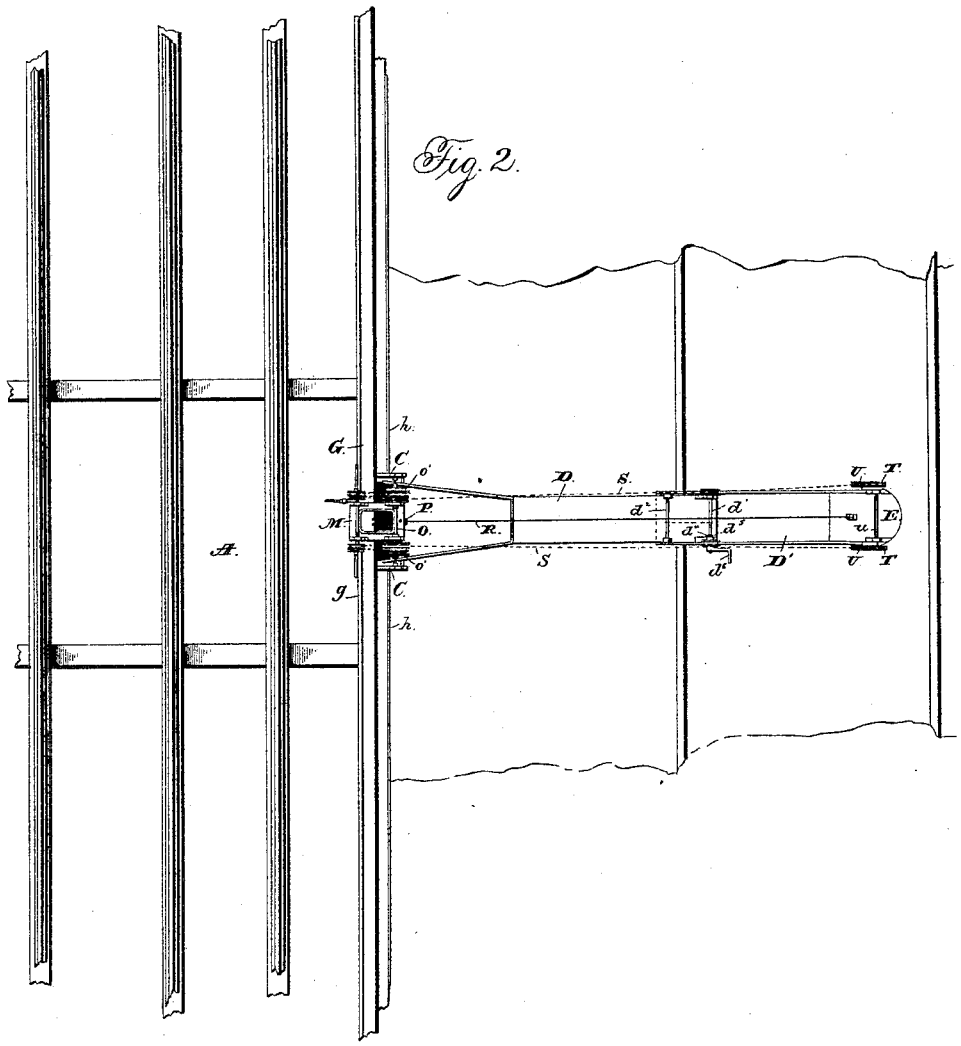
Figure 3:
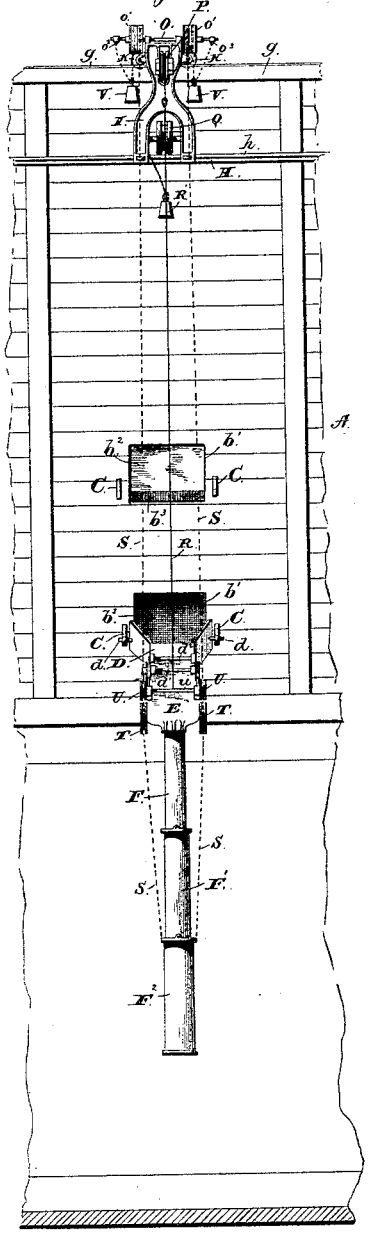
Figure 4:
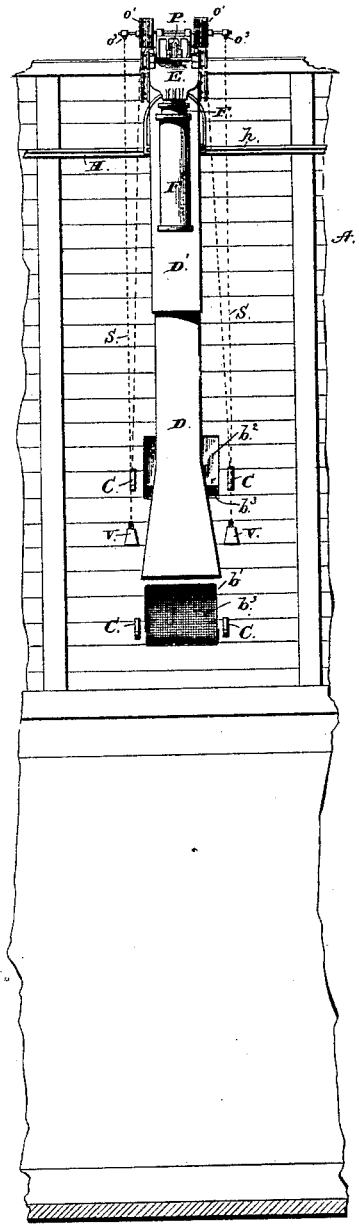
Figure 5:
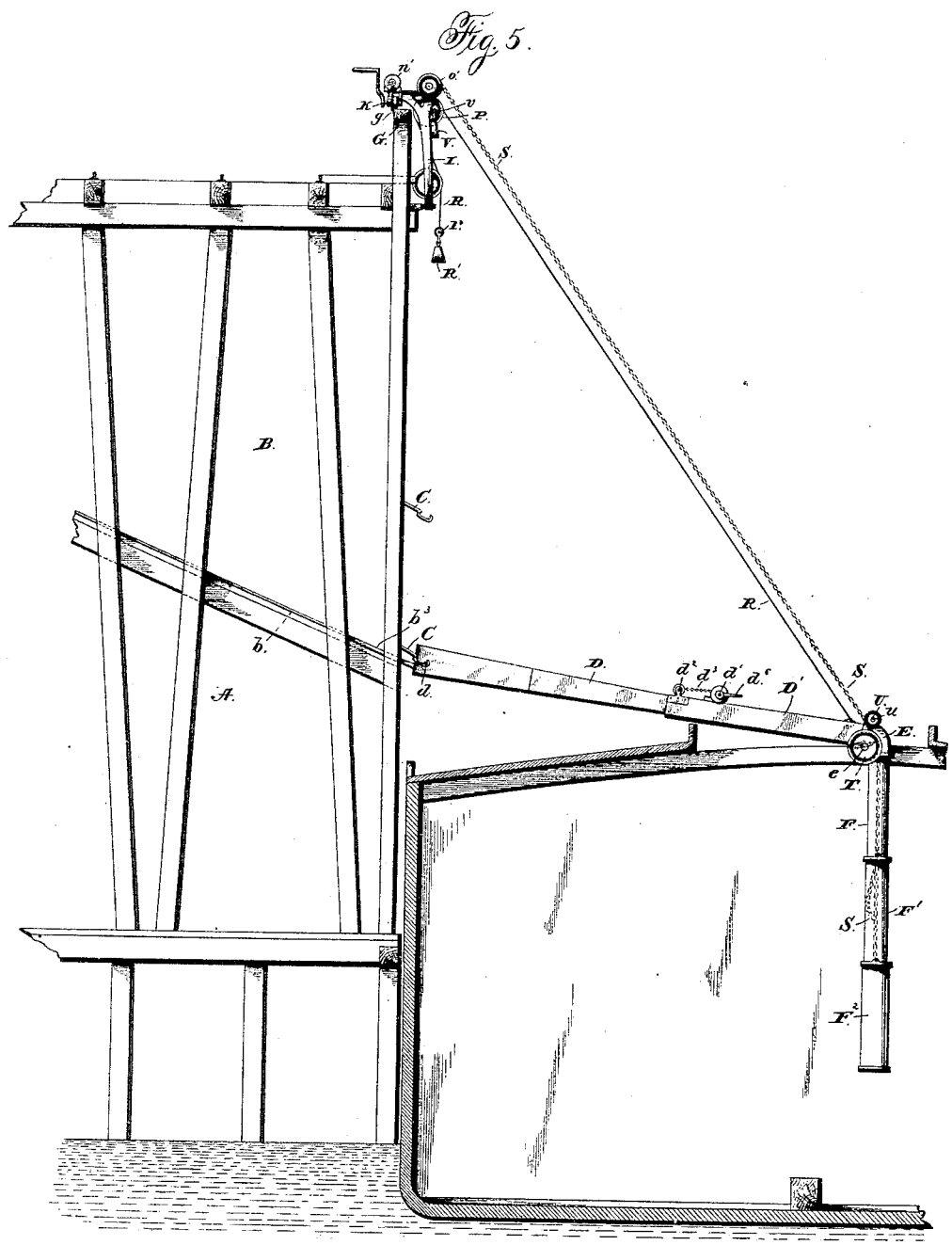
Figure 6:
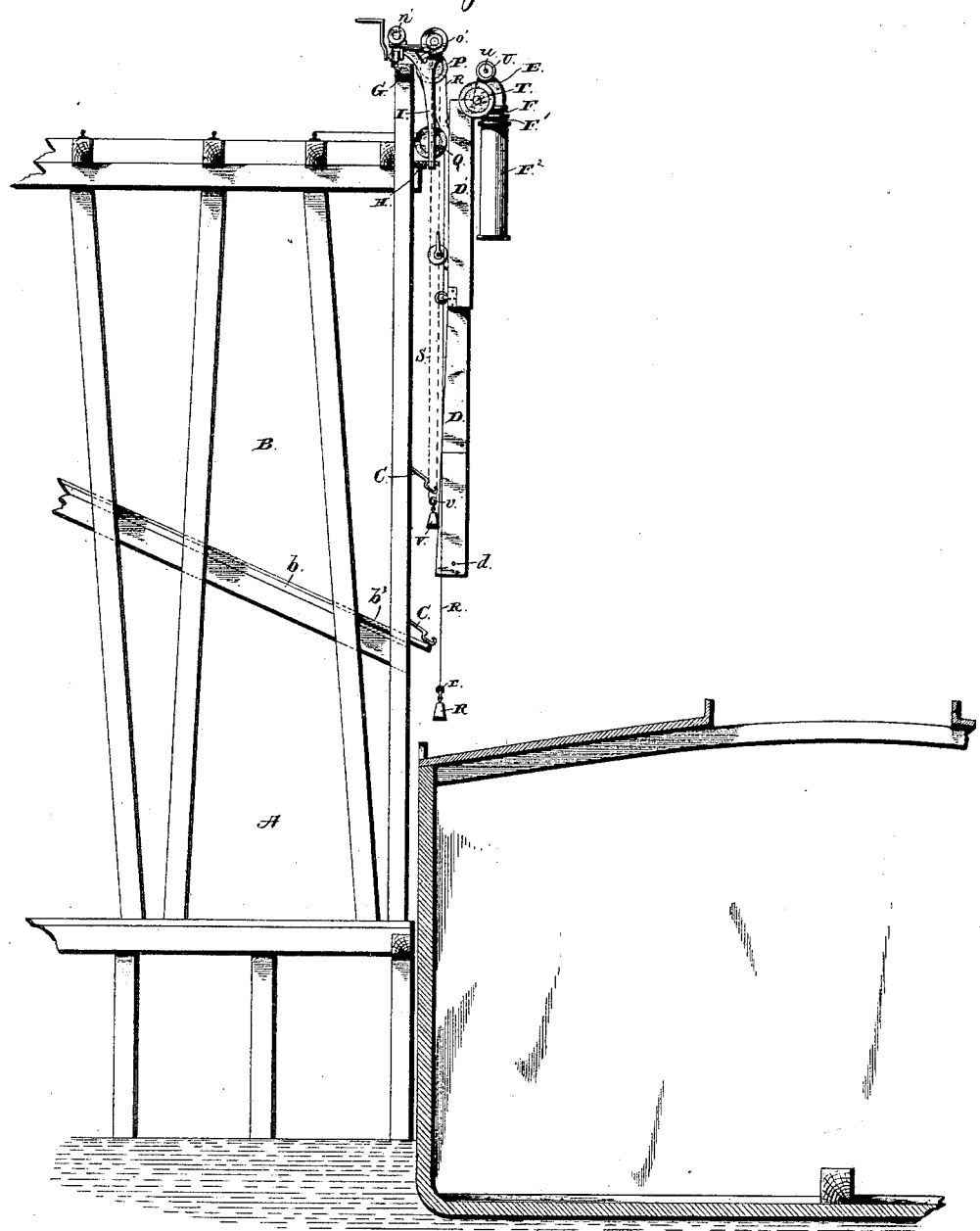
Figure 7:
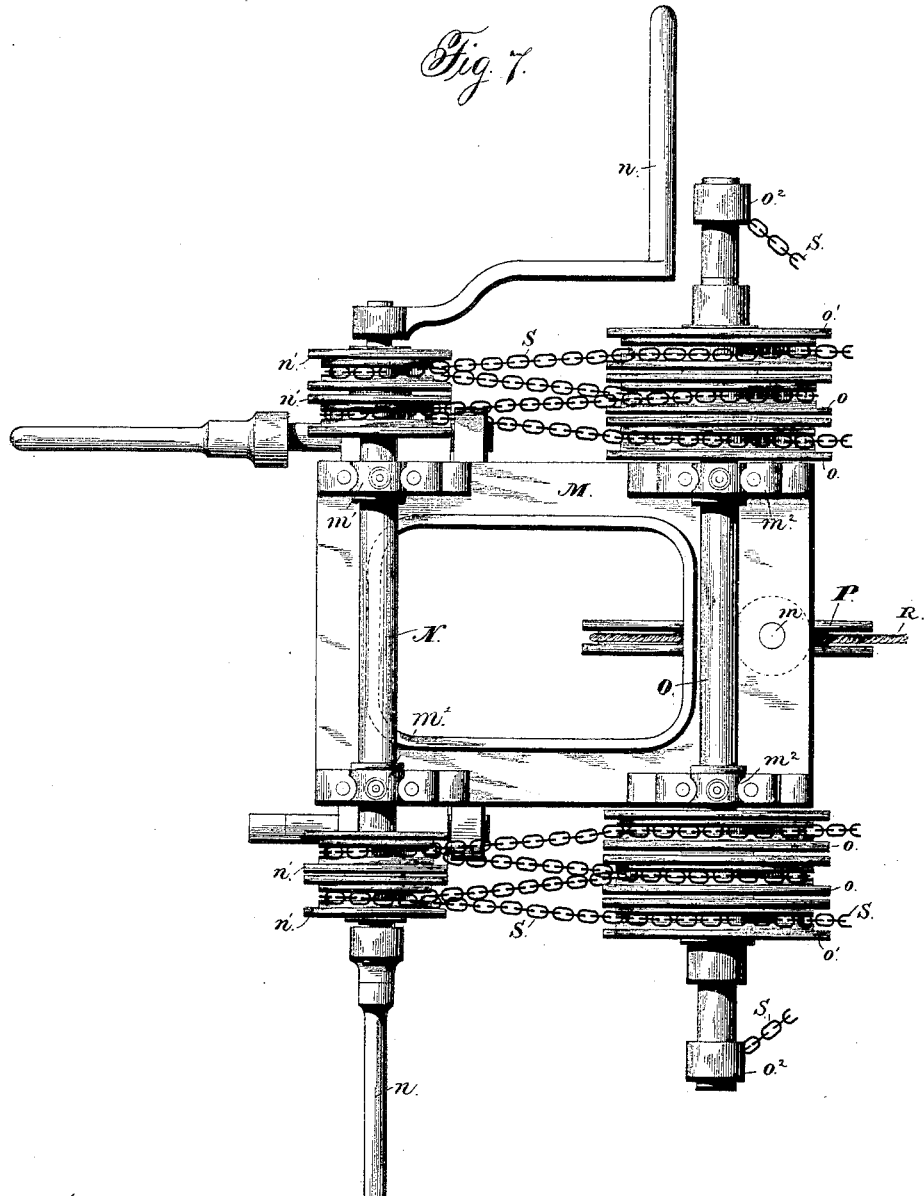
Figure 8:
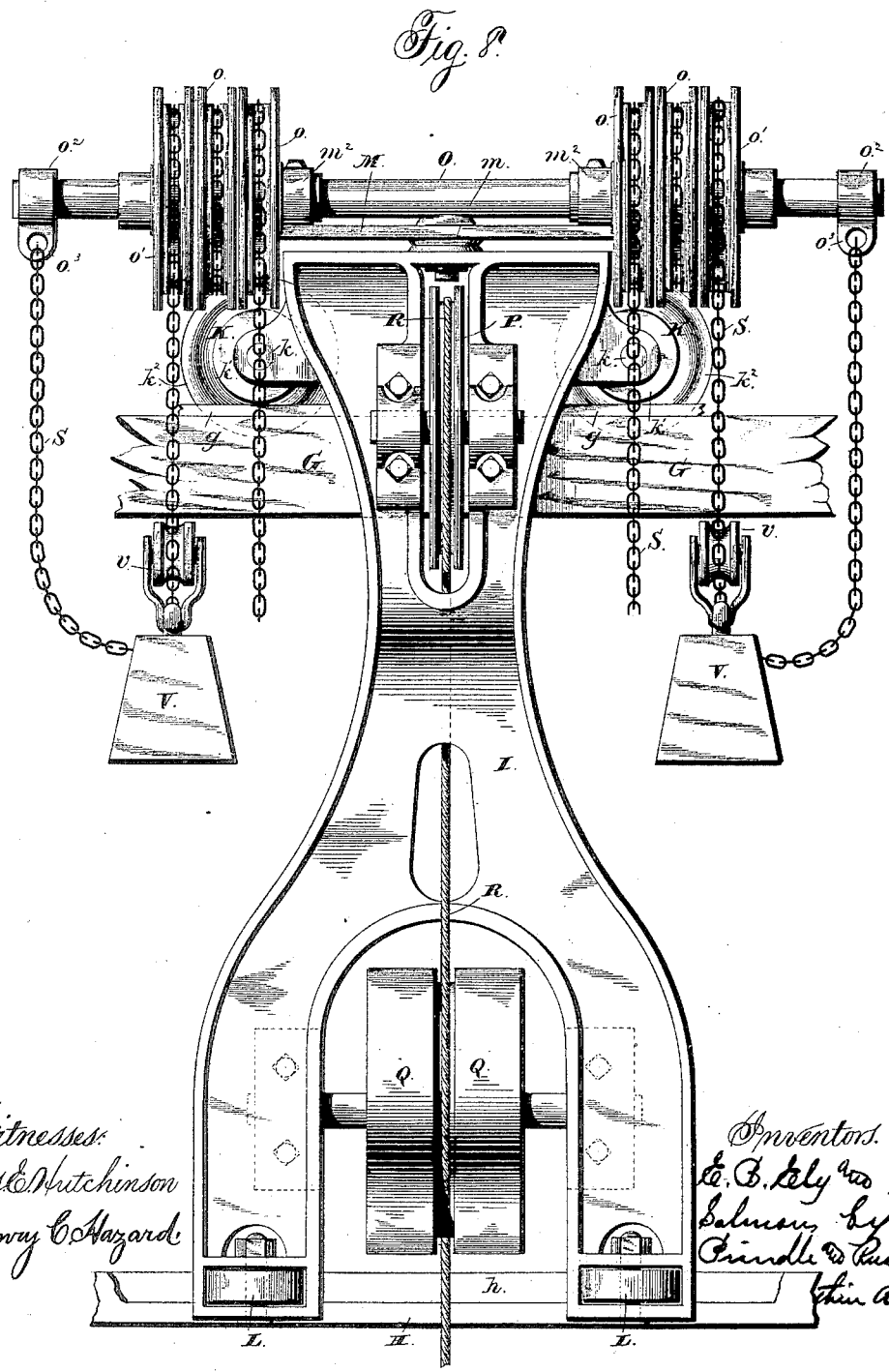
Figure 9:
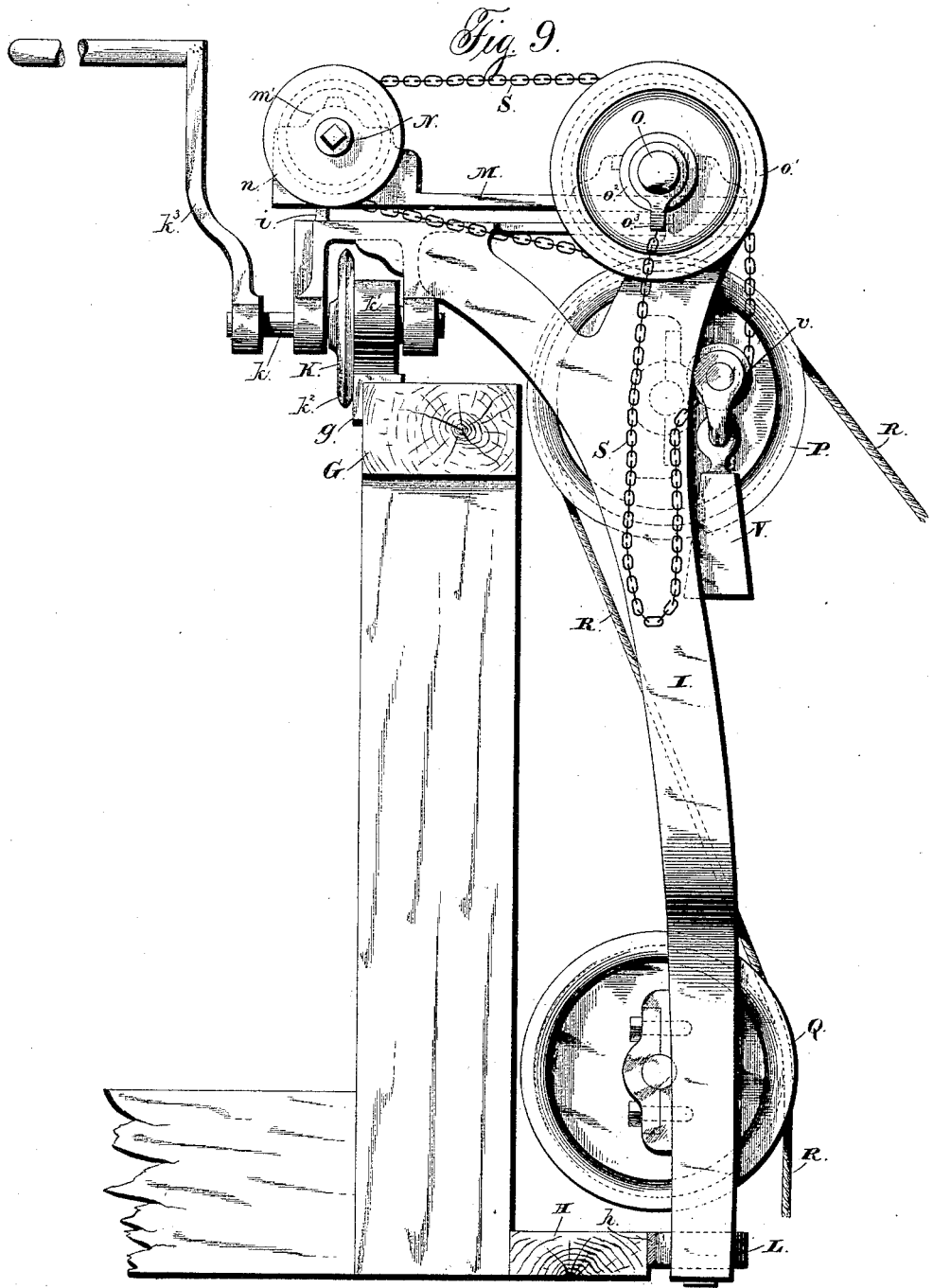
Figure 10:
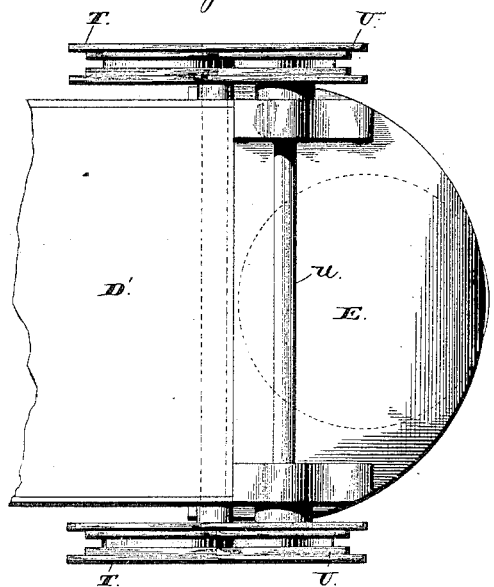
Figure 11:
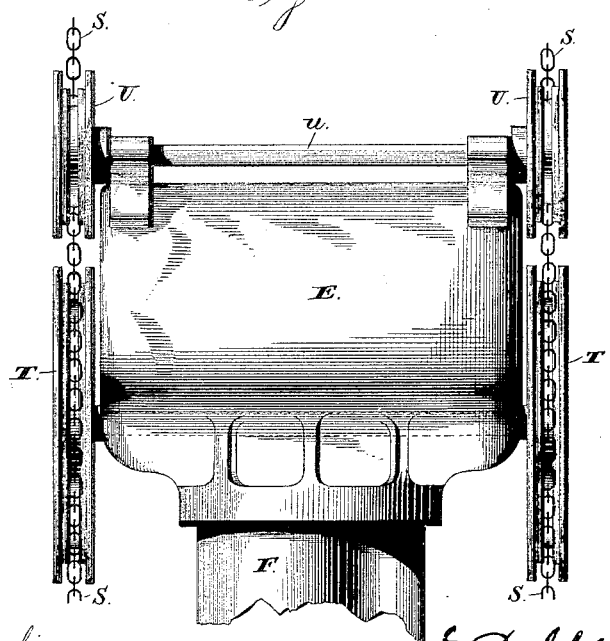
Figure 14:
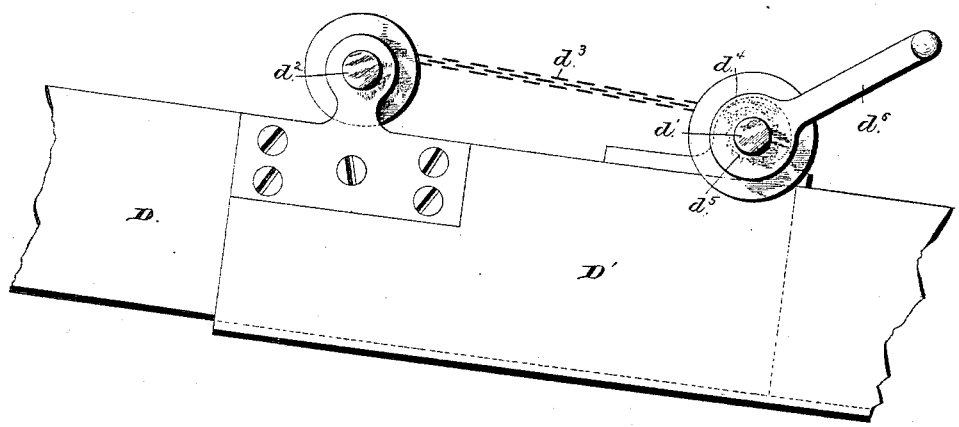

Figure 1 is a perspective view of our apparatus in position for use. Fig. 2 is a plan view of the same. Fig. 3 is a front elevation of said apparatus with the telescopic trunk in position for discharging coal. Fig. 4 is a like view of the same and shows said trunk in the position occupied when not in use. Figs. 5 and 6 are side elevations of said apparatus and show, respectively, the positions occupied by the operative parts when in use and when not in use. Fig. 7 is an enlarged plan view, from the upper side, of the transfer-truck used. Fig. 8 is an enlarged front elevation of the same. Fig. 9 is an enlarged side elevation of said truck. Fig. 10 is an enlarged plan view of the connection between the inclined and vertical portions of the transfer-truck. Figs. 11 and 12 are respectively enlarged front and side elevations of the same. Fig. 13 is an enlarged plan view of the mechanism used for varying the operative length of the inclined chute, and Fig. 14 is an enlarged side elevation of the same.

Letters of like name and kind refer to like parts in each of the figures.

Our invention is designed to facilitate the transfer of coal from a wharf-bin to the hold of a vessel; and it consists in the improved apparatus, as hereinafter specified and claimed, for effecting this result.

Our invention is used in connection with a coal-shipping wharf A, upon which are provided coal-bins B and B, that have each a bottom $b$, which inclines downward and outward, so as to cause the contents to gravitate in such direction. The outer lowest side of such bottom has such height above the water at low tide as to enable coal therefrom to pass by gravity through a suitable conductor to the hatchway of a vessel. Each bin thus constructed is provided with one or more discharge-openings $b'$, that are located within the outer wall immediately above the bottom $b$, and each opening is closed, when desired, by means of a gate $b^2$, while at its lower side is secured a perforated metal plate $b^3$, that has the same inclination as the bottom $b$ and projects from the latter outward and downward beyond the outer wall of the bin.

For use at high tide each bin is provided with other openings $b'$ and $b'$, which are like the discharge-openings described, but are located at higher points and over the low-tide openings.

Projecting outward and downward from each side of each discharge-opening $b'$ is a metal bar C, which at its outer end has the hooked form shown in Fig. 5, and in connection with the bar C upon the opposite side of said opening furnishes a pivotal support for one end of a trough D, said trough end being provided with two trunnions $d$ and $d$, that project from opposite sides and rest within the hooked portions of said supporting-bars C and C. The rear pivoted end of the trough D has a width slightly greater than the width of the adjacent discharge-opening $b'$, so as to adapt it to receive coal passing from the same, and from such point outward nearly one-half its length said trough has a regularly-decreasing width, after which to its outer end its sides are parallel. With the outer end of said trough is connected a second trough D', which has substantially the same transverse dimensions, and is adapted to slide longitudinally over the sides and beneath the bottom of said trough D, so as to enable it to receive the discharge of the latter and to constitute an extensible prolongation of the same. The section D' is moved longitudinally with reference to the section D by means of two shafts $d'$ and $d^2$, one of which is journaled transversely upon the upper side of said section D' and the other upon the upper side of the section D, and are connected by a chain $d^3$, that is wound around said shafts, with one of its ends secured to each of the same. Each shaft is provided with a pawl $d^4$ and ratchet $d^5$, (or other equivalent means,) to prevent rotation and lock the same in place when desired, and one or both of said shafts has attached to its end a crank $d^6$, by which it may be rotated. To extend the operative length of the sectional trough, it is only necessary that the chain should be slackened, when by the action of gravity the outer section would run out; but when it is desired to shorten said trough said chain must be wound upon the shafts, as in case of a windlass.

Upon the outer end, at the lower side of the trough-section D', is pivoted an elbow E, which in side elevation has substantially the form of one-fourth of a circle, and at its upper end has such shape and dimensions as to enable it to inclose the end of said section and to receive such coal as passes from the same. The lower end of said elbow is round, and to the same is secured one end of a round pipe or trunk section F, that from thence extends downward about one-third the length required. A second trunk-section F' is connected with the lower end of the section F, and has such diameter as to enable it to slide longitudinally upward over the same, while to said section F' is connected a third section $F^2$, that is adapted to slide longitudinally over the same, the arrangement being such as to produce a telescopic trunk which may extend to the full length of its three sections, or may be shortened until its length is equal to the length of its upper section only.

It is intended that the coal-discharging mechanism described, when not in use, shall be raised against the side of the coal-bin, and that it shall be capable of transfer from one bin to another, for which purpose the following-described mechanism is employed, viz: Secured upon suitable supports above the top of the bins is a rail G, which is arranged horizontally and in a line with the outer or water side of the same, while at a point below there projects horizontally from the said outer face of said bins a second narrow rail H, that is also arranged horizontally and in a line with said face. The outer edge of said rail H is preferably faced with metal $h$, while the rear upper corner of said rail G is provided with a metal face $g$, as shown. Upon the rails G and H are placed a truck, which is in part composed of a metal frame I, that has the general form shown in Figs. 7, 8, and 9, and is adapted to extend from said rail H upward to a point above said rail G, and thence rearward over the latter to a point in rear of its rear side. Within the upper end, at the rear side of said frame, are two rollers K and K, that are journaled upon horizontal shafts $k$ and $k$, that have each a right angle to the line of said rail. Each of said rollers has a plain tread $k'$, which is adapted to bear upon the upper horizontal face of said rail, and is provided with a radial flange $k^2$, that extends downward beside and bears against the rear vertical face of the same. Said rollers K and K operate to support the weight of said frame I and to furnish a rolling bearing for the same, and to prevent its upper end from being moved outward, while for the lower end a rolling support is furnished by two plain rollers L and L, that are journaled upon vertical axes within the forks of the same and bear upon the face of the rail H. As thus supported said truck may be readily moved upon its rails to any desired position. To facilitate such movement, a crank $k^3$ is fitted to or formed upon the inner end of one of the shafts $k$, by means of which crank said shaft may be rotated and its roller caused to move over the rail. Upon the upper end of the truck-frame I is a plate M, which corresponds thereto in horizontal size and shape, and is connected therewith by means of a pivotal bearing $m$, that is placed at its front end, while its rear end rests upon and is supported by a flange $i$, that projects upward from said frame at such point and extends across the same in a line with the track G, such connection permitting said plate or table to swivel upon said frame. Within suitable bearings $m'$ and $m'$, at the rear end of the table M, is journaled horizontally a shaft N, that is adapted to be rotated by means of crank $n$, which is attached to or formed upon each end, and is provided with four grooved chain-pulleys $n'$ and $n'$, two of which are secured upon said shaft between each end and the contiguous bearing $m'$. A second shaft O is journaled horizontally within the bearings $m^2$ and $m^2$ at the front end of the table M, parallel with the shaft N, and has secured upon each of its projecting ends two grooved chain-pulleys $o$ and $o$. Immediately outside of the same it has journaled a similar loose pulley $o'$, and upon its extreme ends has journaled collars $o^2$, that are provided upon their lower side with eyes $o^3$, to which may be attached the ends of the chains. Within the upper portion of the vertical face of the frame I is journaled a grooved pulley P, which is adapted to rotate in a plane that is parallel with the planes of rotation of the pulleys $n'$ and $o$, while within the lower forked portion of said frame is journaled another grooved pulley Q, which is adapted to rotate in the plane of said pulley P. Near the outer end, at the upper side of the trough-section D', is attached one end of a rope R, which from thence extends upward over the pulley P, and thence downward and outward over the pulley Q, and has attached to its opposite end a weight R', that is of such size as to cause it to nearly counterbalance the weight of the discharge-troughs and telescopic trunk, so that a comparatively-small power will raise the same to the position shown in Fig. 6, or control the lowering of said parts to the position seen in Fig. 5. If desired, said counter-balance may be provided within its upper end with a pulley $r$, and said rope R passed through the same and have its end secured within the frame I, in which event the weight of said part R' would require to be double. From each side of the upper end of the lower trunk-section F² a chain S extends upward over a grooved pulley T, that is journaled upon the pivotal bearing e of the elbow E, thence beneath a second grooved pulley U, which is journaled upon a shaft u at the upper end of said elbow, from thence upward over the innermost pulley o at one side of the transfer-truck, from thence rearward around the innermost pulley r' at the rear of said truck, thence forward around an outer central pulley o at the front, from thence rearward around the outer pulley n', and again forward and over a loose pulley o', from thence downward around a pulley v, that is journaled within or to the upper end of a weight V, and from thence upward to an eye o³ of a journaled collar o², to which eye the end of said chain is secured. The weights V and V are intended to counterbalance a portion of the weight of the trunk and discharge-trough, but principally as means for drawing downward the loose ends of the chains, so as to prevent said chains from leaving their pulleys or fouling upon the same, and, as in case of the counter-balance R', said weights V and V may, if desired, be attached directly to the chains S and S. By means of the chains, pulleys, and shafts described the sections of the telescopic trunk may be closed upward together or permitted to drop downward to their extreme limits, said trunk and the trough may be raised upward out of the way or dropped downward to position for use, and the latter may be moved to and connected with or disconnected from either of the discharge-openings of a coal-bin or of a connecting series of coal-bins.

The operation of the mechanism described is as follows, viz: When no coal is being discharged, the telescopic trunk is drawn upward to its shortest length and, in connection with the discharge-trough, turned upward in front of the coal-bins, as shown in Fig. 6. When a boat is to be loaded, the mechanism is moved laterally until in a line horizontally with the discharge-opening of the bin from which coal is to be taken, and is then adjusted vertically until the trunnions at the rear end of the trough are in engagement with the bracket-supports at such point, after which said trough is lowered to position, its sections extended or moved together until the proper length has been secured, and the telescopic trunk permitted to lengthen out until its lower end is near the bottom of the vessel's hold. With the parts thus arranged, upon raising the gate which closes the discharge-opening of the bin, coal will pass through the trough and trunk outward and downward into the hold of the vessel. As said hold fills up said trunk is shortened, so as to keep its lower end at a suitable height to permit of the free escape therefrom of coal without permitting such fall of the same as to cause breakage and consequent loss.

Having thus described our invention, what we claim is—

1. As an improvement in apparatus for transferring coal from a wharf to a vessel, a sectional trough or chute the inner end of whose inner section is attached to the coal-bin at the wharf, and whose outer section is adjustably connected to said inner section by mechanism consisting of a windlass and chain attached to contiguous ends thereof, whereby the operative length of said trough may be increased, substantially as and for the purpose specified.

2. As an improvement in apparatus for transferring coal from a wharf to a vessel, a trough or chute composed of an inner and an outer section, in combination with a crank-shaft arranged on the outer end of said inner section, and a chain attached to said shaft at one end and to the contiguous end of said outer section, whereby the operative length of the trough or chute may be varied, substantially as and for the purpose shown.

3. As an improvement in apparatus for transferring coal from a wharf to a vessel, a trough or chute composed of an inner and an outer section, in combination with a crank-shaft, and chain connecting adjoining ends of said sections, whereby they may be adjusted with reference to each other, and means for preserving such adjustment, substantially as and for the purpose set forth.

4. As an improvement in mechanism for transferring coal from a wharf to a vessel, the combination of a trough adapted to convey coal from the discharge-opening of a coal-bin to the deck of a vessel, a trunk for conveying coal thence downward into the hold of a vessel, and an elbow connecting said trough and trunk through the medium of a pivotal connection, substantially as and for the purpose shown.

5. As an improvement in mechanism for transferring coal from a wharf to a vessel, the combination of a trough which is adapted to convey coal from a coal-bin to the deck of a vessel, a longitudinally-extensible trunk that is adapted to convey coal from the outer end of such trough to the hold of a vessel, a windlass which is located upon the upper side of or above said coal-bin, and chains that pass from said windlass to the trunk, whereby the operative length of said trunk may be varied and the latter, together with said trough, may be placed in position for use or placed vertically against or in front of said coal-bin, substantially as and for the purpose shown and described.

6. As an improvement in apparatus for transferring coal from a wharf to a vessel, the combination, with a trough adapted to convey coal from the discharge-opening of a coal-bin, of a trunk that is pivotally suspended from the outer end of said trough and adapted to convey coal thence to the hold of a vessel, substantially as and for the purpose shown.

7. As an improvement in apparatus for transferring coal from a wharf to a vessel, in combination with a trough adapted to convey coal from the discharge-opening of a coal-bin to the deck of a vessel, a sectional telescopic trunk suspended from the outer end of said trough, and devices for both the adjustment of the length of said trunk and the support of it and said trough, substantially as and for the purpose shown and described.

8. As an improvement in apparatus for the transfer of coal from a wharf to a vessel, in combination with a trough or chute adapted to be pivotally attached at one end to said wharf, whereby it may be raised to and lowered from a vertical position, a trunk that is suspended from the other end thereof, so as to automatically assume an operative position when said trough or chute is lowered from a raised vertical position, substantially as and for the purpose specified.

9. As an improvement in mechanism for the transfer of coal from a wharf to a vessel, a discharging device consisting of a trough or chute adapted to be attached at one end to the coal-bin at the wharf, and a vertically-arranged trunk attached by an elbow to said trough at its outer end, in combination with a traveling windlass by which it is supported and its movements controlled and is adapted to be moved horizontally in a line parallel with the front of the coal-bin, substantially as and for the purpose shown.

10. As an improvement in mechanism for transferring coal from a wharf to a vessel, the combination of a trough which is adapted to extend between the discharge-opening of a coal-bin and the hold of a vessel and to be raised to a vertical position in front of such coal-bin, a horizontally-movable or traveling windlass that is connected with said trough and is adapted to place in and remove the same from position for use and to vary its operative length, and a weight with cord and pulley which are connected with the frame of said traveling windlass and with said trough and operate to counterbalance the whole or any part of the weight of the latter, substantially as and for the purpose shown.

11. As an improvement in apparatus for transferring coal from a wharf to a vessel, in combination with a trough adapted to convey coal from the discharge-opening of a coal-bin to the deck of a vessel, a sectional telescopic trunk suspended from the outer end of said trough, pulleys mounted upon said trunk, chains attached to its movable sections and passing between said pulleys, and a windlass operating said chains to vary the length of said trunk, substantially as and for the purpose shown and described.

In testimony that we claim the foregoing we have hereunto set our hands this 24th day of April, 1888.

EZRA B. ELY.
     SAMUEL SALMON.

Witnesses:
 HARRY J. DAVIS,
 ELLIOTT A. OBERRENDER.